United States Patent [19]

Chuang

[11] Patent Number: 4,787,416

[45] Date of Patent: Nov. 29, 1988

[54] REGULATOR MEANS FOR AUTOMATICALLY SHUTTING PIPELINE PASSAGE OFF DURING PRESSURE REDUCING FAILURE

[76] Inventor: Rong-Chao Chuang, 113 Nan-Yang Road, Nan-Tsu, Kaohsiung, Taiwan

[21] Appl. No.: 5,933

[22] Filed: Jan. 22, 1987

Related U.S. Application Data

[63] Continuation-in-part of Ser. No. 828,740, Feb. 17, 1986, abandoned.

[51] Int. Cl.[4] ............................................. F16K 31/48
[52] U.S. Cl. ........................... 137/624.12; 137/505.47; 137/495; 137/460; 137/613
[58] Field of Search ...................... 137/624.11, 624.12, 137/505.47, 460, 461, 495, 613

[56] References Cited

U.S. PATENT DOCUMENTS

| | | | |
|---|---|---|---|
| 3,180,356 | 4/1965 | Galley | 137/495 |
| 3,228,417 | 1/1966 | Schwerter | 137/461 |
| 3,424,194 | 1/1969 | Krugan | 137/505.47 X |
| 3,542,052 | 11/1970 | Irwin | 137/505.11 X |
| 3,623,506 | 11/1971 | Bonner | 137/613 |
| 4,223,692 | 9/1980 | Perry | 137/460 X |
| 4,265,270 | 5/1981 | Satoh | 137/495 X |

*Primary Examiner*—Alan Cohan
*Attorney, Agent, or Firm*—Leonard Bloom

[57] ABSTRACT

A regulator means for automatically shutting off gas flow in a pipeline during pressure reducing failure is provided. The regulator means includes a body member, a pressure reducing valve assembly, a switching valve assembly, a timing device for a predetermined time period of gas flow, a transmission plate for controlling switching valve assembly by the timing device, and an automatic overflow control assembly. The body member is provided with a pressure reducing valve chamber, a timing device chamber and a thin wall located between the pressure reducing valve chamber and the timing device chamber. The timing device chamber receives the timing device, and the pressure reducing valve chamber receives the pressure reducing valve assembly. The switching valve assembly is arranged at the outlet port of the gas flow passage. The switching valve assembly consists of a spindle, a leakage-proof seal ring, and a spiral spring. The transmission plate can control the left and right displacements of the spindle of the switching valve assembly to make the switching valve carry out the opening and closing functions and can signal the user to learn the occurrence of a pressure reducing failure. An up-stream automatic gas leakage over flow control assembly is located at the inlet port of the body member. The automatic gas leakage overflow control assembly consists of a steel bead for blocking gas passage automatically and a release button. During gas leaking and overflowing, the steel bead automatically blocks the gas flow through the pipeline. When the user wants to resume gas flow, he passes down the release button displacing the steel bead from its blockage position, and then the gas flow in the pipeline is restored.

5 Claims, 4 Drawing Sheets

REGULATOR MEANS FOR AUTOMATICALLY SHUTTING PIPELINE PASSAGE OFF DURING PRESSURE REDUCING FAILURE

CROSS REFERENCE TO RELATED APPLICATION

The application is a continuation-in-part of co-pending application Ser. No. 828,740, now abandoned, the disclosure of which is incorporated herein in its entirety.

FIELD OF THE INVENTION

The present invention relates to regulators and devices for the regulation of a flow of a gaseous stream and, in particular, to a gas service regulator which has automatic shut off valve assemblies, as well as pressure reduction valve assemblies in order to control and regulate the flow of a gas stream therethrough.

BACKGROUND OF THE INVENTION

Currently, liquified propane gas fuel is widely utilized in devices in ordinary households. Such a device includes a high pressure gas steel cylinder, a main supply valve, a pressure reducing regulator and a low pressure pipeline connected with the gas oven, in which, the pressure reducing regulator has two functions: to transform the approximately 6 kg/cm$^2$ (60,000 mmHg.) high pressure gas in the steel cylinder to approximately 280 or 400 mmHg. low pressure gas, and to close and contain the high pressure gas in the cylinder during a pressure reducing failure. A cause of pressure reducing failure is often simply because the user forgets to shut off the main supply valve or because foreign matters are deposited at the place of contact between the outer end of the gas inlet port in the pressure reducing regulator means and the rubber pad attached to the head of the lever-type bolt shaft for reducing pressure, or because said rubber pad is broken due to over age, thereby preventing the rubber pad from normally closing the gas inlet, so the pressure of the high pressure gas cannot be reduced to a predetermined level, but results in a gradual pressure increase in the pressure reducing chamber. At this moment, if no proper measure is taken to remove the defect, and the gas supply is still used, the low pressure pipeline will be damaged and may cause a disaster. To avoid such a defect, the conventional pressure reducing regulator is provided with an automatic pressure relief design for pressure reducing failure to automatically and immediately discharge the high pressure gas through the relief valve, whenever the pressure reduction fails and the pressure in the pressure reducing chamber is higher than the predetermined pressure. Although this design can prevent the high pressure gas from damaging the downstream low pressure pipeline, it still has the following disadvantages: (1) it is impossible to sense the pressure reducing failure and it is easy to cause disasters, if and when the gas supply is continuously used without any warning; and (2) although a relief valve is attached to the conventional pressure reducing regulator to discharge the high pressure gas from within, the gas discharged would fill up the space in the user's house, since for convenience the users often store the gas steel cylinder in their house, so this approach is still highly risky in posing threats to harm the human body or to cause fires and/or explosions as well. When the pressure reducing failure takes place during use, the high pressure gas may damage the downstream low pressure pipeline and then leak in a large amount to cause a grave disaster.

PRIOR ART

More improved conventional designs feature that the gas regulator means and automatic flow shut-off device are meshed in use to achieve the object of safety. For instance, the following U. S. patents are known: Satch, U.S. Pat. No. 4,265,270; Joseph et al, No. 3,623,506; Kruzan et al, No. 3,228,417; Irwin et al, No. 3,542,052; Galley et al, No. 3,180,356; Perry, No. 4,223,692; and Beese, No. 1,339,383, etc.

However, up to the present, the conventional designs have their defects such as the structure is so complicated that the DC motor sensor or detector, or electromagnetic valve is used for control which often makes cost increase and also the increase on the damage rate of the whole set such as shown in the U.S. Pat. Nos. 4,265,270, 3,180,350 and 4,223,692. Or a tool must be used for resetting and this is comparatively more inconvenient, as shown for instance in the U.S. Pat. Nos. 3,623,506; 3,424,194 and 3,228,417. Or when the abnormal overpressure conditions take place, the gas is discharged into the atmosphere but this poses dangers of explosion, as shown for instance in the U.S. Pat. No. 3,542,052. Besides, all the functions of the above said patents cannot avoid possible disasters due to the users' carelessness, and they do not have a timed shut-off device to avoid the chances of possible unexpected accidents to be caused by fires at different places due to the gas leakage on account of the users' carlessness to shut off the gas supply valve.

In order to overcome the defects of conventional regulator means, the applicant has thoroughly studied them and finally created this invention, a regulator means for automatically shutting gas pipeline passage off during pressure reducing failure.

This invention has three disaster-preventive functions; to automatically shut off the pipeline during the downstream leakage overflow, to automatically shut off the pipeline passage at the preset time, and to automatically signal the pressure reducing failure.

OBJECTS OF THE PRESENT INVENTION

The object of this invention is to provide a regulator means for automatically shutting gas pipeline passage off during pressure reducing failure and to rapidly sense the pressure reducing failure due to mechanical trouble, when a timed automatic shut-off device is operated to prevent any disasters from taking place.

Another object of this invention is to provide a regulator means for automatically shutting the switching valve of the gas pipeline passage off during pressure reducing failure.

A further object of this invention is to provide a regulator means for automatically shutting gas pipeline passage off during pressure reducing failure which can automatically shut off the gas flow passage while the gas leaks and overflows.

The related technical skills and arrangements used by this invention for the above objects and other objects will be described by concrete embodiments with accompanying drawings.

A BRIEF DESCRIPTION OF THE DRAWINGS

FIGS. 1-1 to 1-3 are graphic views of the body member of the regulator means for automatically shutting gas pipeline passage off during pressure reducing failure of the invention; in which FIG. 1-1 is a top view of the body member; FIG. 1-2 is a sectional view along the line X—X of FIG. 1-3 and the part N is a sectional view of the automatic overflow control device; FIG. 1-3 is a bottom view of the body member.

DETAILED DESCRIPTION OF THE INVENTION

Said regulator means for automatically shutting the gas pipeline passage off during pressure reducing failure in the present invention consists of such major components as a body member, a timing device, a pressure reducing valve assembly, a switching valve assembly, a transmission plate, and an automatic overflow control device assembly, in which said body member is a cylindrical form and basically comprises a timing device chamber, a pressure reducing valve chamber and a thin wall between said timing device chamber and said reducing valve chamber. Said automatic overflow control device assembly is positioned at the gas inlet pipeline. Said timing device is received within the timing device chamber, and the transmission plate of said timing device actuates the switching valve assembly. When said regulator means is activated, after the gas pressure is reduced by the pressure reducing valve, then the pressure-reduced gas flows to the gas outlet pipeline through the switching valve, the details will be described in the following.

Figure 2:
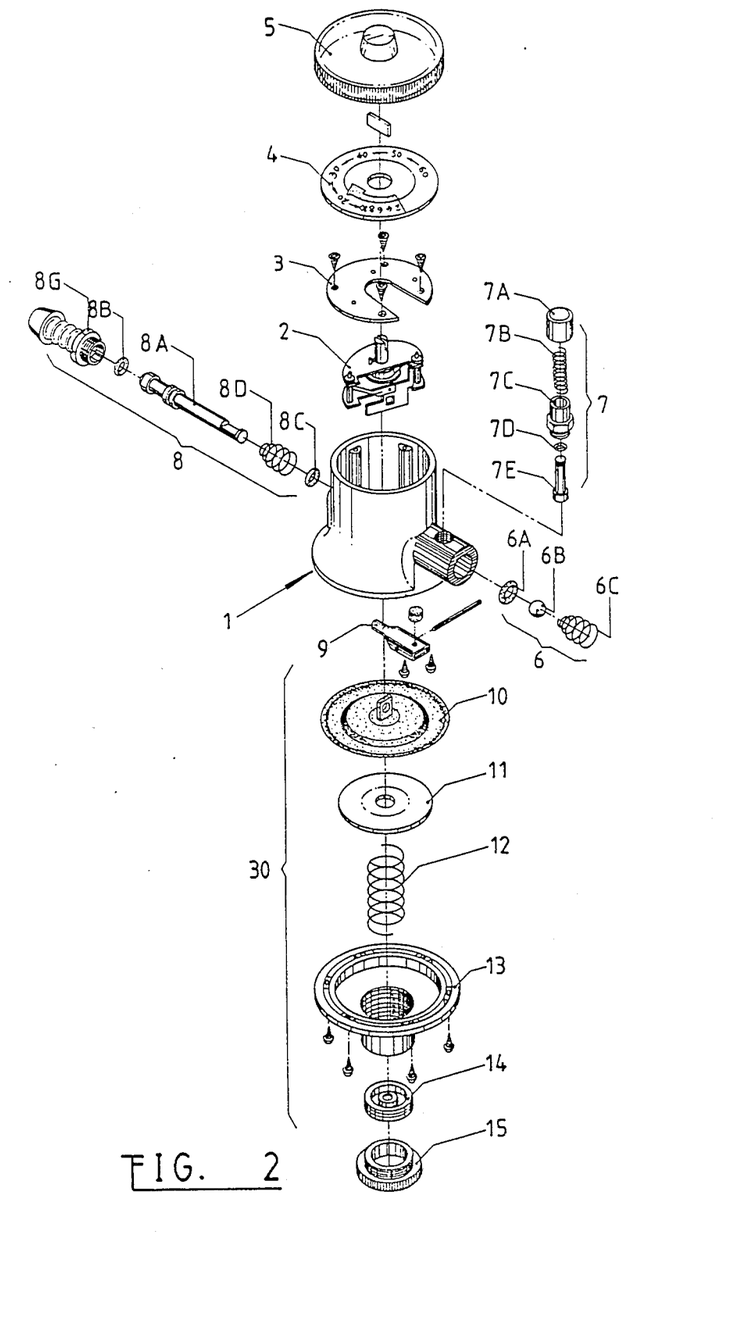
FIG. 2 is a part exploded view of the parts of the regulator means for automatically shutting gas pipeline passage off during pressure reducing failure of the invention.

Referring to FIGS. 1-1 to 1-3, outer ends of both lateral sides of the body member 1 have a gas inlet port 1A and a gas outlet port 1B respectively. Near inner end of said gas inlet port $1A_1$ in said body member 1 is provided with an inlet nozzle $1A_2$. A thin wall 1K is integrally formed with said body member 1 and is located transversely in said body member 1 to divide the interior of said body member 1 into a reducing valve chamber 1E and a timing device chamber 1H. The wall surface of said thin wall 1K which is facing said timing device chamber 1H is provided with a radial projection $1H_1$ near the gas outlet port 1B; said projection $1H_1$ is provided with a through hole $1H_2$ at its front end to communicate with the gas outlet port 1B, so that a below-described spindle 8A of the switching valve 8 is able to be extended into the timing device chamber 1H through said through hole $1H_2$. In addition, three projections $1H_5$ are arranged generally equally spaced on said wall surface of thin wall 1K facing said timing device chamber 1H. Each of said projections $1H_5$ has a recess respectively to fit three set screws on said timing device 2 so as to maintain an appropriate distance between said timing device 2 and thin wall 1K. Facing the wall surface of said thin wall 1K of said reducing valve chamber 1E, two opposite protruding posts 1D are provided in the two front sides of said inlet nozzle $1A_1$. Said two posts 1D are located higher than the inlet nozzle $1A_1$ and also are provided with a rectangular recess $1D_1$ and a threaded hole $1D_2$ respectively to install the below-described components of the pressure reducing valve. At the opposite position relative to the gas inlet port has a projection $1E_1$. A through hole $1E_2$ is provided on top end face of said projection $1E_1$ to communicate with said gas outlet port 1B and through hole $1H_2$. Thus, when said switching valve 8 (as shown in FIG. 2) is actuated, the reduced pressure gas flows from said through hole $1E_2$ into said through hole $1H_2$ and also to the gas outlet port 1B.

Figure 3:
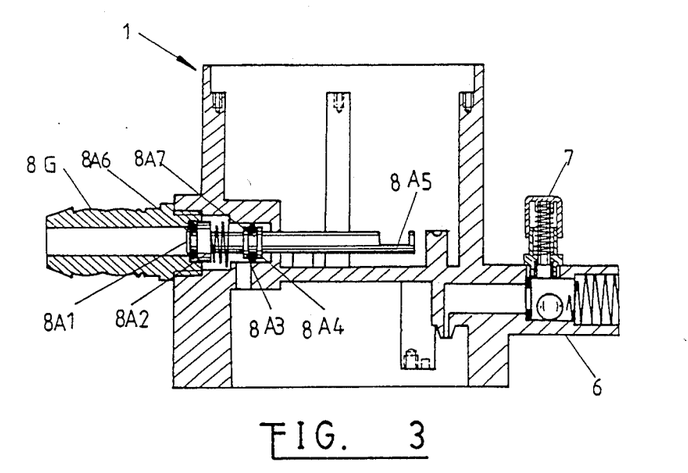
FIG. 3 is a partial cross-sectional view of the regulator means for automatically shutting gas pipeline passage off during pressure reducing failure of the invention, disclosing the state that the switching valve closes the pipeline gas outlet port and that the automatic pipeline shut-off arrangement closes the pipeline of the gas inlet port.
Figure 4:
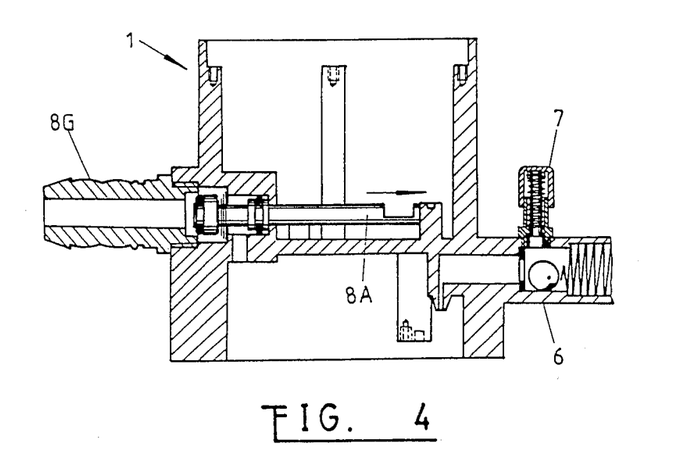
FIG. 4 is a partial cross-sectional view of regulator means for automatically shutting gas pipeline passage off during pressure reducing failure related to this invention, disclosing the open state of said switching valve and automatic pipeline shut-off arrangement.

Referring to FIGS. 2, 3 and 4, a switching valve 8 is illustrated in said figures. Said switching valve 8 is arranged at said gas outlet port 1B in the gas flow passage and is positioned by screwing gas pipe adapter 8G. Said switching valve 8 consists of spindle 8A, leakage-proof seal rings 8B, 8C, and a spiral spring 8D. Said spindle 8A is of a cylindrical shape and is provided with first, second, third and fourth flanges $8A_1$, $8A_2$, $8A_3$, $8A_4$, respectively and a recess $8A_5$, in which the outer diameter of flange $8A_1$ is smaller than that of flange $8A_2$ and an annular groove $8A_6$ is formed between said two flanges. An oil seal ring 8B is located in said annular groove $8A_6$, so that switching valve can positively block the opening of the outlet gas pipe during closing to make gas no longer flow. The outer diameters of flanges $8A_3$ and $8A_4$ are approximately equal and are all smaller than the outer diameter of flange $8A_2$. An annular groove $8A_7$ is formed between flanges $8A_3$ and $8A_4$ to receive an oil seal ring 8C to prevent gas from leaking out of the through hole $1H_2$ and into the timing device chamber 1H. Outer diameters of said flanges $8A_3$ and $8A_4$ are smaller than the inner diameter of the smaller diameter end of the spiral spring 8D, so that the smaller diameter end of said spiral spring 8D is able to pass through flanges $8A_3$, $8A_4$ and to directly press against the back side of the flange $8A_2$. Thus, when the transmission plate 2B (See FIG. 6) no longer pushes said spindle 8A, the restoring force of said spiral 8D and the pushing force of the gas flow make the spindle 8A move leftward to block the opening of said gas pipe adapter 8G and to shut off the pipeline passage along the flow direction. Said spindle 8A is provided with a recess $8A_5$ at its and to adequately mesh the transmission plate 2B attached to the timing device 2. When said regulator is actuated, said transmission plate 2B pushes said spindle 8A toward the right. At this moment, the front end of said spindle 8A moves away from the opening of said gas pipe adapter 8G to allow gas flowing into said gas pipe adapter 8G from the gas outlet port 1B. Because the design of shutting off the pipeline passage along the flow direction is adopted in this invention, it is impossible for gas to leak outside while pressure reducing failure occurs before or during operation.

Figure 6:
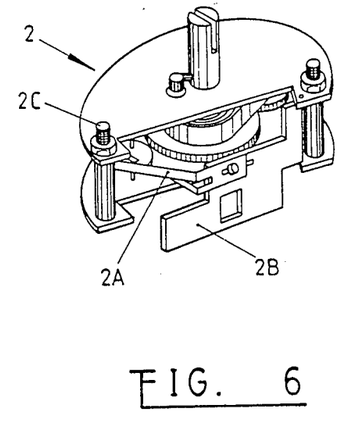
FIG. 6 is a perspective view of the regulator means for automatically shutting gas pipeline passage off during pressure reducing failure of the invention showing the assembly of the timing device and transmission plate.

Referring to FIG. 6, a long rectangular leaf spring 2A is provided in said timing device 2. An end portion of said leaf spring 2A presses directly against one of set screws 2C on said timing device 2. When the timing device is set to a positive amount of time, the elastic pressing action of said leaf spring 2A urges the rear end of said transmission plate 2B against said spindle 8A of said switching valve to allow said switching valve 8 to be maintained in an open state. Or, when said timing device reaches zero time, the rear end of said transmission plate 2B no longer presses against said spindle 8A toward said switching valve thereby allowing said switching valve to move to a closed state due to the urging of spring 8D. Said transmission plate 2B is formed of a metal sheet having 1-mm thickness wherein its rear end can bear approximately 0.5 kg/cm$^2$ pressure. When the switching valve is in an open position and when the pressure born by said transmission plate 2B exceeds 0.5 kg/cm$^2$, said transmission plate 2B will be bent out of shape and be rendered unable to urge said spindle 8A to keep said switching valve 8 open. Thus, when a pressure reducing failure occurs to cause the pressure in said reducing valve chamber to increase above 0.5 kg/cm$^2$ (generally, 10 times of the normal pressure 40 mmHg), the high pressure gas, whose pressure is not reduced, flows and cannot successfully escape from through hole 1H$_2$ via the through hole 1E$_2$ because of the tight clearances provided by seal-ring 8C. As a result, said high pressure gas forms a leftward pushing force against the flange 8A$_2$ (See FIG. 3) to make said switching valve 8 close. Under such circumstances, the transmission plate 2B cannot maintain said switching valve open to supply gas. The bent position of the transmission plate as a result of excessive pressures due to pressure reduction chamber failure can be used as a signal or alarm to let the users know that a pressure reducing failure has occurred.

Figure 7:
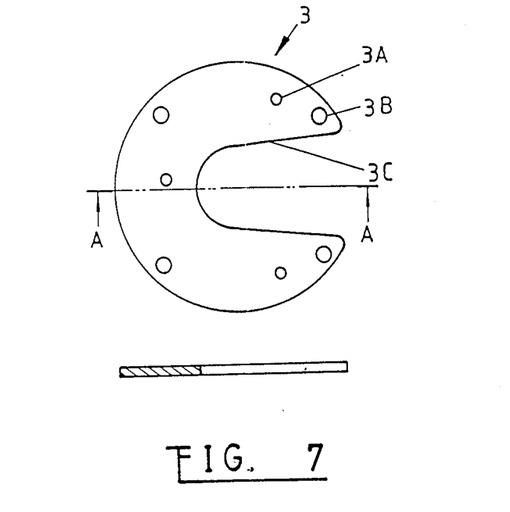
FIG. 7 is a plan view of a cover plate for the timing device in the regulator means for automatically shutting gas pipeline passage off during pressure reducing failure of the invention.
Figure 8:
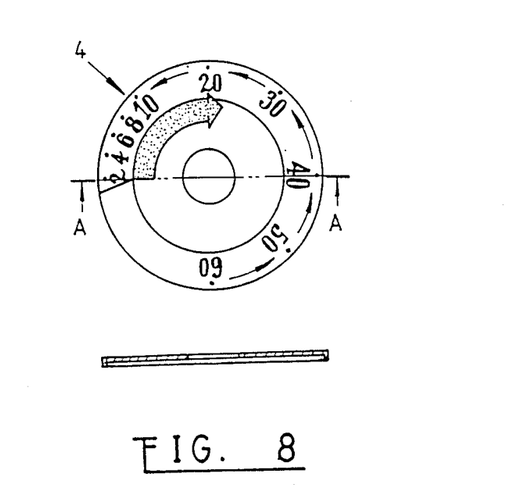
FIG. 8 is a plan view of the time scale cover plate for the regulator means for automatically shutting gas pipeline passage off during pressure reducing failure of the invention.
Figure 11:
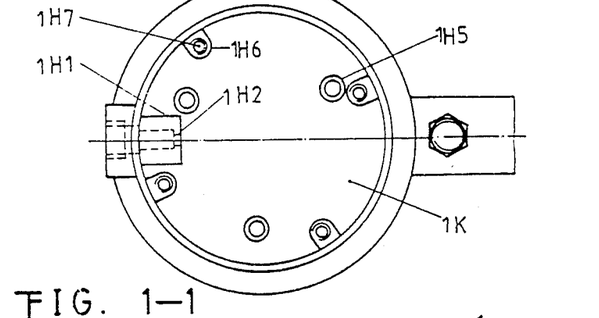
Figure 12:
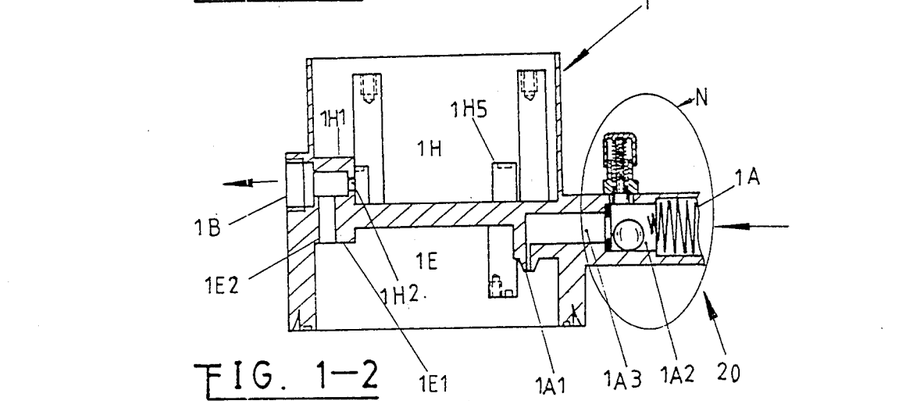
Figure 13:
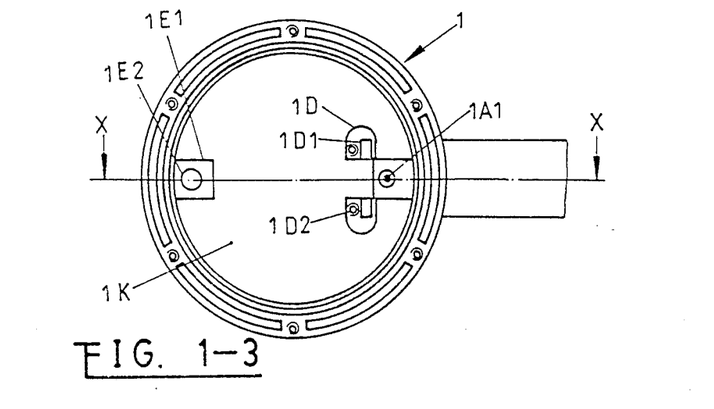

FIG. 7 shows a fixed cover plate 3 for said timing device. Said cover plate 3 for said timing device is basically a round plate sheet. A big, elongated approximatly arcuate cutout 3C is provided on said cover plate 3. Three smaller holes 3A in said round plate are used to fit said three set screws on said timing device 2 respectively. In addition, four round holes 3B near the periphery of said round plate are used for engaging with said four threaded holes 1H$_7$ (See FIGS. 1-1 to 1-2) in said four semicircular cross-sectional support racks 1H$_6$ on the inner wall of said timing device chamber in body member 1. During assembly, said timing device 2 is fitted on the top of the projection 1H$_5$ first. Then three smaller holes 3A in the cover plate 3 for said timing device are engaged with three set screws on said timing device 2. Then said four round holes 3B on said cover plate 3 for said timing device 2 are aligned with four threaded holes 1H$_7$ in the top of said four semi-circular cross-sectional support racks 1H$_6$ respectively and fastened by screws. Assemblers can use the cutout 3B to observe from outside if the assembly is correctly conducted or not and if the transmission plate 2B attached to said timing device actually actuates the spindle 8A of said switching valve or not during and after assembly.

Figure 5:
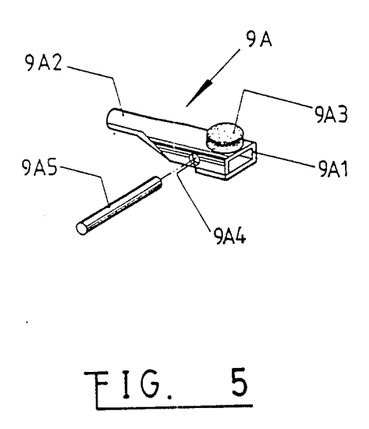
FIG. 5 is a perspective view of the lever-type bolt shaft of the regulator means for automatically shutting gas pipeline passage off during pressure reducing failure related to this invention.

Referring to FIGS. 2 and 5, the reducing valve assembly 30 consists of a pressure reducing component 9, a leakage-proof diaphragm 10, a round metal sheet 11, a spring 12, a cover 13, an adjusting ring 14, and a bottom cover 15. The lever-type bolt shaft 9A and pivot 9A$_5$ of said pressure reducing component 9 are shown in FIG. 5. Said lever-type bolt shaft 9A is made of bent light metal, its front end is a square hollow head 9A$_1$, and a thin and round rubber piece 9A$_3$ attached to said square hollow head 9A$_1$ contacts the inlet nozzle 1A$_1$ (See FIG. 1-2). Rear portion 9A$_2$ of said lever-type bolt shaft 9A is of a small arcuate cross section to engage with leakage-proof diaphragm 10. Both sides of said square hollow head 9A$_1$ are provided with a hole 9A$_4$ respectively to receive said pivot shaft 9A$_5$ passing through. Being passed through holes 9A$_4$, both ends of said pivot 9A$_5$ are received in rectangular recesses 1D$_1$ (See FIG. 1-3), and then the heads of screws engaged with holes 1D$_2$ fixes said pivot 9A$_5$ in said rectangular recesses 1D$_1$ so as to set said reducing valve component 9. Other parts are generally the same as those used in prior art pressure regulator, and they will not be discussed here.

Referring to FIG. 2, a time scale cover 4 is attached to the top of said timing device chamber 1H (See FIGS. 1-1 to 1-2) of said body member 1. Graduations for 0–60 minutes are fully visible and are engraved on said plate 4 to let the users set the time they wish to use gas, and the top of the spindle 8A of said timing device protruding through the center hole of said cover 4 is meshed with a rotary disc 5 of the gas valve. During assembling the pressure reducing valve assembly 30, the leakage-proof seal diaphragm 10 is fitted on the tail stock of the lever-type bolt shaft, and the round metal sheet 11 is fitted on the bottom of said lever-type bolt shaft and then the spring 12 is used to directly press against the bottom of said round metal sheet 11, thereby making said round metal sheet 11 and spring 12 directly press against said leakage-proof cover diaphragm 10. And then, the adjusting ring 14 and bottom cover 15 are attached to cover 13 of said pressure reducing valve. Finally, said cover 13 is fastened to body member 1 by screws. A pressure relief hole is not provided in the center of said leakage-proof diaphragm 10 (this is different from the conventional leakage-proof diaphragms). Thus, there is no gas leaked to outside even during pressure reducing failure. In order to optimize the design of this invention, an automatic overflow control device 20 is provided at the inlet port 1A in said regulator means (See FIG. 1-2).

Drawing section N shown in FIG. 1-2 depicts the automatic overflow control device 20, which is equipped at the gas inlet 1A pipeline passage in the right side of said body member. Said device 20 includes an automatic shut-off assembly 6 (See FIG. 2) at the inlet port 1A of said body member for automatically shutting the pipeline passage off during pressure reducing failure or gas overflow. A release button 7 (See FIG. 2) is situated above said automatic shut-off arrangement 6 and is used for striking down the steel bead 6B and clearing the passage to restore the smooth gas flow. Said automatic shut-off arrangement 6 further includes an oil seal ring 6A located between a pipeline passage 1A$_2$ and having a diameter larger than that of a steel bead 6B at the inlet port 1A and a smaller pipeline passage 1A$_3$, a steel bead 6B in front of said oil seal ring 6A for blocking the opening of said oil seal ring 6A, and a positioning spring 6C or an eccentric round steel plate (not shown in the figure) in front of said steel bead for preventing said steel bead 6B from rolling too far away from said oil seal ring 6A. Thus, steel bead 6B can be kept at an appropriate place in said passage 1A$_2$. Release button 7 includes a base 7C with threads at its lower part and located above the pipeline passage 1A$_2$, a connecting rod core 7C with a lower portion having a larger outer diameter, and also with a threaded upper portion for engaging with the pressing cap 7A, an oil seal ring 7D engaging with the larger diameter lower portion of said connecting rod core 7E and frictionally fit with said connecting rod core 7E for preventing gas from leaking, a spring 7B, and a push cap 7A located above the base 7C and engaging with the upper portion of the connecting rod core 7E. Said spring 7B is situated between said push cap 7A and bottom base 7C and is used to allow the push cap 7A and the connecting rod core 7E engaging with the push cap 7A to move back to their original positions together, after the pressure applied on the top of the push cap 7A is released.

In operation and during normal use, with reference to FIG. 1-2 the high pressure gas flows into the inlet 1A from the gas cylinder or supply pipeline and then into the inlet nozzle 1A$_1$, and the pressure reducing chamber 1E. The round thin block 9A$_3$ (in FIG. 5) on the pressure reducing component 9 and the gas inlet nozzle 1A$_1$ matingly control the flowing-in gas volume and further regulate the gas pressure in the pressure reducing chamber 1E. The pressure reducing component 9 is pivoted by the pivot 9A$_5$ on the rectangular recess 1D$_1$, and the distance between the tail end 9A$_2$ and the pivot 9A$_5$ is longer than that between the head 9A$_1$ and the pivot 9A$_5$. When the pressure of the gas entering the pressure reducing chamber 1E is high, the force that the gas exerts on the leakage-proof diaphragm 10 is strong enough to overcome the total of the forces that the spring 12 exerts on the leakage-proof diaphragm 10. Thereby, the round thin block 9A$_3$ through the round metal plate 11 causes the round thin block 9A$_3$ of said pressure reducing component 9 to move toward the gas inlet nozzle 1A$_1$ which in turn makes the gas volume entering the pressure reducing chamber 1E reduced and also the gas pressure therein lowered. Conversely, when the pressure of the gas entering the pressure reducing chamber 1E is low, this will reduce the gas pressure acting on the leakage-proof diaphragm 10, which in turn permits the force that the spring 12 exerts on the leakage-proof diaphragm 10 to overcome the force that the gas exerts on the leakage-proof diaphragm 10, thereby causing the round thin block 9A$_3$ on the pressure reducing component 9 to move away from the gas inlet nozzle 1A$_1$, which increases the gas volume entering the pressure reducing chamber 1E, and therefore also the gas pressure therein is increased. The above-described method of operation causes the gas in the pressure reducing chamber to maintain a stable predetermined pressure level. The gas pressure at the outlet can be adjusted to a predetermined level by the adjusting nut 14 to adjust the force that the spring 12 exerts on the leakage-proof diaphragm 10.

The lower end of the timing device 2 has a round piece to mesh the projection of the transmission plate 2B. When said round piece engages said projection, the restoring force of the spiral spring 8D and the pushing force of the gas flow make the spindle 8A move leftward to block the opening of the gas adapter 8G, i.e. to shut off the switching valve. When the timing device 2 is turned clockwise, for instance, to the place of 30-minute mark, said round piece is removed from said projection to make transmission plate 2B radially move outward. Because the transmission plate 2B engages the recess 8A$_5$ of the spindle 8A of the switching valve 8, the transmission plate also drives the spindle 8A rightward to urge the switching valve to an open state. Thereby, the reduced pressure gas flows from the pressure reducing valve chamber 1E to the through hole via the through hole 1E$_2$, and then to the gas outlet 1B and finally to the gas-consuming apparatus. After the set time expires, e.g. 30 minutes, said round piece engages said projection again to shut off the switching valve 8. The time scale plate 4 also indicates the set time to achieve the purpose of the timed control. When the timing device 2 is turned counterclockwise, this will make the switching valve 8 fully open and free from the timed control to become a common air-tight switching valve, i.e. the gas passage is fully open and free from the time limits. Since this particular feature is in common with conventional devices, no further elaboration on this aspect of the invention is needed here.

When the pressure in the pressure reducing chamber 1E increases to a level above the maximum pressure 0.5 kg/cm$^2$ that the transmission plate 2B can bear due to the pressure reducing failure, the high pressure gas with an unreduced pressure flows from the pressure reducing chamber 1E into the through hole 1H$_2$ via the through hole 1E$_2$, and said high pressure gas forms a leftward pushing force against the flange 8A$_2$ (See FIG. 3) to make the switching valve 8 block the outlet hole 1B in the flow direction and also to make the transmission plate 2B bend and thus become impossible to actuate the spindle 8A of the switching valve 8. Therefore the switching valve 8 cannot be opened to supply gas and thereby the user is signaled to be aware of the pressure reducing failure.

In accordance with another aspect of the invention, when the pressure reducing valve arrangement fails to function or if the gas reducing elements are disconnected, the gas pressure in the pipeline to the left of the oil seal ring 6A is reduced due to the gas flow speed increase. In conjunction with reduced pressure to the left of seal 6A, there is a sharp gas pressure difference between an increased gas pressure in the pipeline to the right of the oil seal ring and the gas pressure in the pipeline to the left of the oil seal ring. The difference in gas pressure causes gas flow to rush into the smaller pipeline 1A$_3$ to the left of the oil seal ring 6A and forms a very strong suction force to the round bead 6B to lift the round bead 6B, to move the bead 6B, and to block the opening of the oil seal ring 6A. Furthermore the high pressure gas remains in the gas inlet 1A to continue to make the round bead 6B to be subject to the high pressure gas action and thus snugly stick on the oil seal ring 6A. Thereby, bead 6B automatically cuts high pressure gas flow to restore high pressure gas flow when the round bead 6B blocks the opening of the oil seal ring 6A, the user only needs to apply a pressure on the top face of the push cap 7A to actuate the connecting rod core 7E to knock down said round bead 6B, thereby restoring the smooth gas flow. Said connecting rod core 7E can be returned to its original position by the force of said spring 7B to complete the resetting process without adversely affecting the normal gas flow.

In summary, the invention can shut-off the gas flow from a low pressure outlet at a present time. The invention can also signal the user to be aware of a pressure reducing failure. In addition, when high pressure gas overflows, the invention responds automatically to block the high pressure gas flow to avoid disasters.

I claim:

1. A regulator means for automatically shutting off gas flow during pressure reducing failure includes:

a body member which is cylindrical in shape and is provided with a timing device chamber including a top face; a pressure reducing valve chamber; a thin wall that partitions and is located between said two chambers, said thin wall including an upper surface and a lower surface; outer ends of both sides of said body member having a gas inlet port and a gas outlet port; an inner end of said gas inlet port being provided with an inlet nozzle; a wall surface of said thin wall facing said timing device chamber and having four semi-circular cross-sectional support racks including tops formed integrally with said body member and with a height slightly shorter than that of the top face of said timing device chamber, and the top of said support racks being provided with threaded holes for engaging said timing device cover plate; a projection provided on said upper wall surface of thin wall; said projection including a through hole communicating with said gas outlet port; three projections being arranged approximately equally spaced on said upper wall surface of thin wall; the lower wall surface of thin wall facing the reducing valve chamber being provided with two opposite protruding posts in front of both sides of said inlet nozzle and said two posts being longer than the length of the inlet nozzle and having a rectangular recess and a threaded hole respectively on their tops for installation of a pressure reducing valve component; for controlling gas flow through said inlet nozzle;

timing device means attached to said body member, said timing device means including a bendable transmission plate being attached to a switching valve which is constructed and arranged to be biased toward a closed position by pressure in the reducing chamber against the resilience of the bendable transmission plate;

a cover plate for fixing said timing device with respect to said body member;

a time scale plate located above said cover plate for permitting a user to set a time for gas use;

a rotary disc located on top of said body member for setting said timing device;

a switching valve assembly including a switching valve in said pressure reducing valve chamber for controlling the reduced pressure gas flow;

a pressure reducing valve assembly including a pressure reducing component, a leakage-proof seal diaphragm, a round metal plate, a spring, a pressure reducing valve cover plate, an adjusting ring supporting said spring, and a bottom cover said pressure reducing valve assembly for adjusting a predetermined pressure;

an automatic overflow control assembly in communication with said gas inlet, said automatic overflow control assembly including an automatic pipeline shut-off assembly and a release button assembly for deactuating said automatic pipeline shut-off assembly;

whereby when a pressure reducing failure takes place and the pressure in said pressure reducing valve chamber exceeds the predetermined pressure, said transmission plate is unable to actuate said switching valve so as to signal the occurence of a pressure reducing failure; and whereby, when gas overflows, said automatic overflow control assembly will actuate said automatic pipeline shut-off assembly.

2. The regulator means described in claim 1, wherein said switching valve assembly is located near said gas outlet port in a gas flow passage and is fixedly screwed by a gas pipe adapter to said body member, said switching valve assembly including a spindle of a cylindrical shape having four flanges and a recess in which the outer diameter of the first flange is smaller than that of the second flange and said first and second flanges form an annular groove; said switching valve assembly further including an oil seal ring located in said annular groove so that said switching valve can precisely block the opening of the gas outlet pipe during shutting so as to completely stop a gas flow; both outer diameters of third and fourth flanges being approximately the same diameter and being smaller than the outer diameter of said second flange; an annular groove being formed between the third and fourth for receiving an oil seal ring to prevent gas from leaking out of a through hole and from flowing into said timing device chamber whereby the outer diameters of said third and fourth flanges are smaller than the inner diameter of a smaller diameter end on a spiral spring whereby the smaller diameter on the spiral spring is able to pass through said third and fourth flanges and to press against the back side of said second flange whereby when the transmission plate no longer presses against said spindle, a restoring force of said spiral spring in conjunction with the pushing force of gas flow move the spindle leftward to block an opening in a gas pipe adapter and thus shut off gas flow; said spindle being provided a recess at its end to fit said transmission plate attached to said timing device; whereby when said regulator means is actuated, said transmission plate pushes said spindle to move rightward causing the front end of said spindle to move away from said gas pipe adapter to allow gas to flow into said gas pipe adapter from said gas outlet port.

3. The regulator means described in claim 1, wherein said automatic pipeline shut-off assembly further includes an aperture oil seal ring located between an outer passage at the inlet port of said body member and an inner passage in said body member, said outer passage having a diameter larger than that of a steel bead and larger than the inner passage, said steel bead located in front of said oil seal ring for blocking the aperture of said oil seal ring, and a positioning spring on an eccentric round steel plate in front of said steel bead for preventing said steel bead from rolling too far away from said oil seal ring; whereby, said steel bead is kept between said inner and outer passages; whereby when said pressure reducing valve assembly fails and gas overflows, said steel bead blocks the aperture of said oil seal ring to automatically shut off gas flow into the gas inlet.

4. The regulator means described in claim 3, wherein said release button assembly further includes a base with threads at its lower part and located above a portion of said gas inlet, a connecting rod core including a lower enlarged end and a threaded upper portion for engaging with a push cap, an oil seal ring mounted next to the enlarged end of said connecting rod core and also frictionally fitting said connecting rod core for preventing gas from leaking around said ring, a spring and said push cap located above said base and joined with the upper portion of said connecting rod core; said spring urging the push cap and connecting rod core engaging with said push cap to move back together to their original positions, after the pressure applied to the top of said push cap is released; , whereby when said steel bead blocks the opening of said oil seal ring, a pressure is applied to the top of said push cap, so said connecting rod core is actuated to strike down said steel bead, thereby removing said steel bead from blocking gas flow.

5. In a device for the regulation of the flow of a gaseous stream having a pressure condition, said device being of the type having a housing including an inlet port and an outlet port, means positioned at the inlet port being responsive to the pressure condition of the gaseous stream for preventing the flow of a gaseous stream through said inlet port, a pressure reducing valve positioned between the inlet port and the outlet port for reducing the pressure condition of and regulating the flow of the gaseous stream through the regulator, and means for selectively preventing the flow of the gaseous stream through the outlet in response to the pressure condition of the gaseous stream, the improvement thereon comprising:

the housing having an upper timing chamber and a lower pressure reducing chamber, wherein the inlet port and the outlet port are each formed in the pressure reducing chamber;

the pressure reducing valve includes an adjustable, deformable diaphragm positioned in the reducing chamber for deforming movement away from the inlet port in response to an increase in the pressure condition of the gaseous stream, means for adjusting the diaphragm to selectively increase and decrease its deformation to the pressure condition of the gaseous stream, a first shut off valve pivotably mounted in the pressure reducing chamber, said shut off valve including a rearward portion secured to the diaphragm and further including a head portion, wherein deforming movement of the diaphragm in response to an increase in the pressure condition of the gaseous stream pivots the head portion into a first position, so that said head portion contacts the inlet port, preventing the gaseous stream from entering the reducing chamber, and further wherein when the diaphragm is not deformed in response to the pressure condition of the gaseous stream, the head portion of the shut off valve is pivoted into a position spaced from the inlet port permitting the free flow of the gaseous stream through the inlet port and into the pressure reducing chamber; and a second shut off valve slidably disposed in the outlet port, said second shut off valve having a first position, wherein the second valve contacts the outlet port preventing the free flow of the gaseous stream therethrough and a second position, wherein the second valve is spaced from the outlet port, permitting the free flow of the gaseous stream from the pressure reducing chamber through the outlet port; and a timer having a deformable portion being operatively coupled to the second shut off valve, such that the second valve moves between its first and second positions in response thereto; and wherein the second shut off valve may move into its first position in response to the pressure condition of the gaseous stream, thereby deforming the deformable portion of the timer.

* * * * *